United States Patent [19]

Wheeless

[11] Patent Number: 5,023,934
[45] Date of Patent: Jun. 11, 1991

[54] APPARATUS AND METHOD FOR COMMUNICATION OF VISUAL GRAPHIC DATA WITH RADIO SUBCARRIER FREQUENCIES

[75] Inventor: Jesse Wheeless, San Antonio, Tex.

[73] Assignee: Radair, Inc., San Antonio, Tex.

[21] Appl. No.: 547,521

[22] Filed: Jul. 2, 1990

Related U.S. Application Data

[63] Continuation of Ser. No. 163,364, Mar. 2, 1988, abandoned.

[51] Int. Cl.$^5$ ............................................. H04B 7/26
[52] U.S. Cl. ..................................... 455/45; 455/72; 455/23; 455/54
[58] Field of Search ................... 455/45, 53, 23, 54, 455/20, 11, 72, 12, 9; 370/118

[56] References Cited

U.S. PATENT DOCUMENTS

| | | | |
|---|---|---|---|
| 3,080,556 | 3/1959 | Bretthaupt | 343/6 |
| 3,146,442 | 1/1962 | Hansford et al. | 343/6 |
| 3,713,146 | 1/1971 | Carroll et al. | 343/6 A |
| 4,078,245 | 3/1978 | Johnson et al. | 455/45 |
| 4,259,746 | 3/1981 | Sandstedt | 455/600 |
| 4,347,618 | 6/1980 | Kavouras et al. | 375/37 |
| 4,348,693 | 5/1980 | Cauldwell | 358/140 |
| 4,521,857 | 6/1982 | Reynolds, III | 364/439 |
| 4,623,922 | 11/1986 | Wischermann | 358/160 |
| 4,642,775 | 5/1985 | Cline et al. | 364/443 |

OTHER PUBLICATIONS

Richard H. McFarland, "An Experiment Investigation of the Efficacy of Automated Neather Data Transmission to Aircraft in Flight", 1982, National Technical Information Service.

*Primary Examiner*—Douglas W. Olms
*Assistant Examiner*—Ralph Smith
*Attorney, Agent, or Firm*—Baker & Botts

[57] ABSTRACT

A data communication system in which video data is digitized, compacted, and transmitted by a frequency modulated radio station having a subsidiary communication authorization. The data is broadcast on a subcarrier channel to a radio receiver, which is connected to a microcomputer. This microcomputer generates a visual graphic display on a screen, and performs various other functions, such as error checking and permitting the user to alter the display. One application of the invention is real time monitoring of visual information by a remote receiving station. Furthermore, the invention may include a receiver that is turnable, thereby providing data to a mobile receiving station, such as an airplane. Although the invention is especially useful for monitoring weather information, it is adaptable for use with any visual graphics data that is desired to be transmitted via FM subcarrier frequencies.

23 Claims, 12 Drawing Sheets

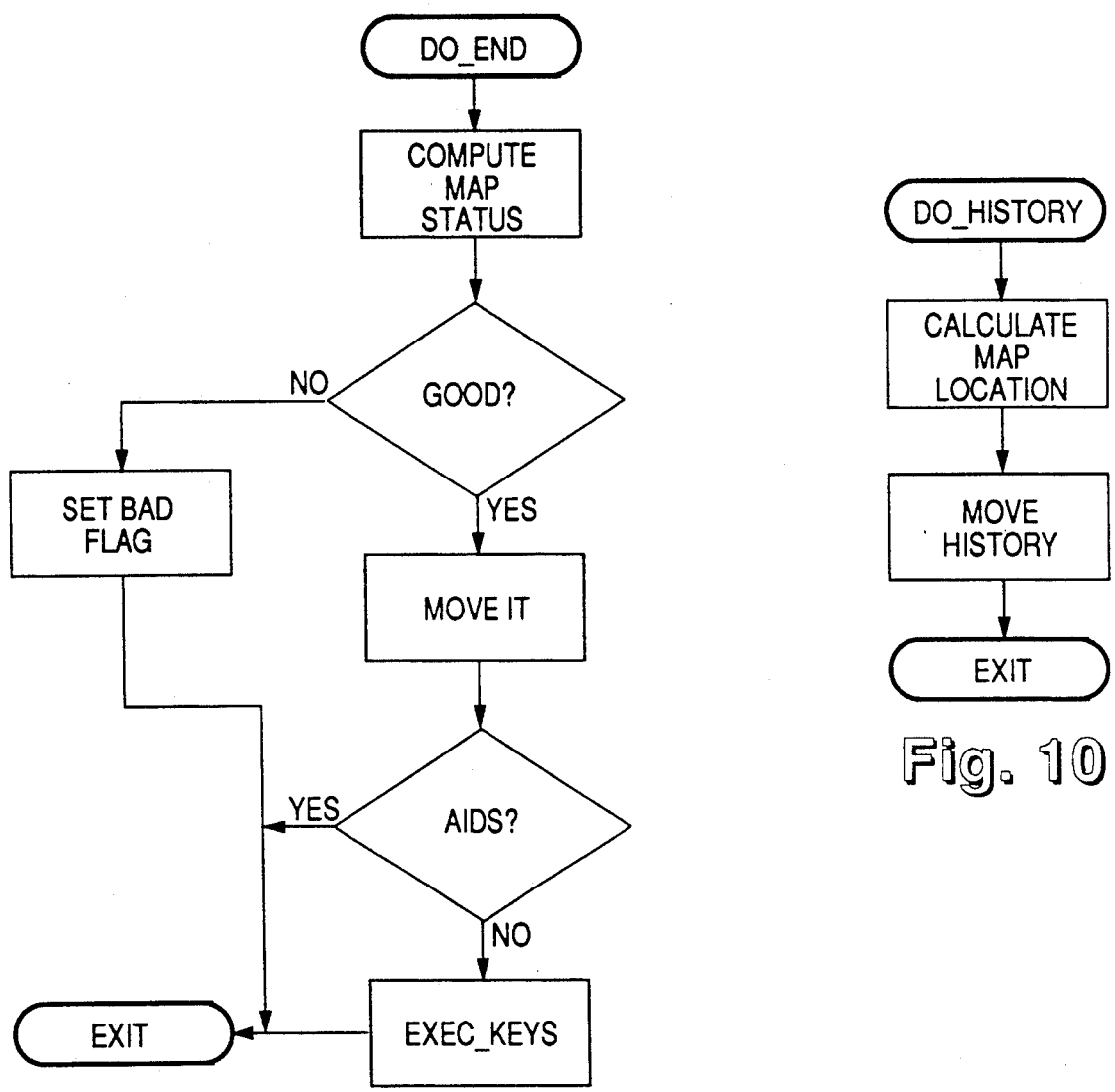

5,023,934

APPARATUS AND METHOD FOR COMMUNICATION OF VISUAL GRAPHIC DATA WITH RADIO SUBCARRIER FREQUENCIES

RELATED APPLICATIONS

This application is a continuation of application Ser. No. 07/163,364, filed Mar. 2, 1988 entitled "Apparatus and Method for Communication of Visual Graphic Data With Radio Subcarrier Frequencies" by Jesse Wheeless, now abandoned.

BACKGROUND OF THE INVENTION

Abbreviations

AFSK—Audio frequency shift keying
AGC—Automatic gain control
bps—bits per second
CPU—Central processing unit
CRT—Cathode ray tube
EEPROM—Electrically erasable and programmable read only memory
EPROM—Erasable programmable read only memory
FSTV—Fast scan television
IF—Intermediate frequency
LED—light emitting diode
LORAN—long range navigation
MMU—Memory management unit
NWS—National Weather Service
SAM—Synchronous address multiplexer
SCA—Subsidiary communications authorization
SDLC—Synchronous Data Link Control
TTL—transistor-transistor logic
VDC—Video display controller
VIP—visual information projection
VOR—very high frequency omnidirectional radio range

Field of Use and Other Background

In general, modern data communications involves the transmission and receiving of information, which is processed before transmission. The processing step may consist of both coding and modulation.

Modulation techniques have been applied to broadcast audio signals at subsidiary communications authorization (SCA) radio frequencies. Common applications are pocket pagers and "piped in" music at commercial establishments. SCA transmissions can also include "visual transmission", which when used with appropriate receiving apparatus, permits visual presentation of information transmitted, such as on a screen or printout.

Apart from SCA transmission, another recent application of visual transmission is FSTV, or fast scan television, in which analog data is transmitted. An advantage of these analog transmissions is that they do not require the features of digitized graphics, such as addressability of points on a display screen. A disadvantage, however, is that they do not permit processing by the user.

In the field of weather monitoring, advances have been made in weather information dissemination from information gathering sites to remote receivers. For example, The National Weather Service (NWS) maintains a network of radar installations at various locations throughout the United States. Radars at these locations make periodic observations about precipitation for dissemination to remote subscribers.

U.S. Pat. No. 4,347,618 discloses a system for providing NWS service data to various stationary receiving units, such as TV stations or airline operations facilities. The patent describes the Weather Bureau Radar Remote equipment used at the NWS locations to transmit NWS data by telephone lines.

A common purpose of transmitting NWS data is for television broadcast. There are several systems for such transmitting NWS data to the broadcast station. In one television broadcast system, the NWS radar scope is scanned by a television type camera. Using a modem, the data is transmitted over a telephone line to the television station where it is received and stored in an electronic memory. This memory is then electronically scanned to form a television picture for broadcast.

In another type of television system, the NWS video information is digitized and stored in an electronic memory. The contents of that memory are transmitted by telephone line to the television station. The data is there stored in another electronic memory, where only those signals necessary to form a television-compatible signal are extracted. This type of system is disclosed in U.S. Pat. No. 4,348,693.

In U.S. Pat. No. 4,347,618, radar video information is processed by computer at a location proximate to the NWS radar console. The computer also provides map overlays. The video and azimuth inputs are arranged into a rectangular format compatible with the raster scan used on television displays. This same patent also discloses a receiver for presenting the data immediately on a conventional raster scan display or for further transmission via commercial TV broadcast. The receiver intercepts the transmitter by dial up and has a memory and several other features.

A characteristic of television broadcasting is that it requires a greater bandwidth than other radiotelephonic communication. Thus, the weather communication systems described above, which broadcast to the user by means of television video signals, use television rather than radio receivers.

U.S. Pat. No. 3,080,556 discloses a system for communicating picture information, which requires a wide frequency range, over a standard voice channel. The invention derives an electronic signal in a relatively narrow bandwidth by using a slow-scan spiral sweep on the face of a cathode ray tube. The signal is heterodyned into a radio frequency carrier, which may be amplitude or frequency modulated. A conventional demodulator system is used to filter the radio frequency and cancel the sweep signal to leave only the video signal. The video signal is not digitized. This means that the video is displayed "as transmitted" and no data processing at the remote receiving unit is accomplished.

A disadvantage of systems described above is that they do not permit the user to maintain weather information while moving from one broadcast range to another. Although U.S. Pat. No. 4,521,857 discloses a network of broadcast stations, the user connects with these stations by means of air-to-ground telephones.

A feasibility study in 1982 studied a method a transmitting weather data to an aircraft cockpit using existing VOR transmission. A prototype included a standard VHF navigation receiver and a microprocessor. The microprocessor was used only as a means of storage and for printing to a dot matrix printer. The equipment was large in size. The need for size reduction, visual CRT display, tuning, and noise reduction capabilities was recognized but not implemented. This feasibility study is disclosed in a report entitled "An Experimental Investigation of the Efficacy of Automated Weather Data Transmission to Aircraft in Flight," by Richard H. McFarland, dated 1982, available through the National Technical Information Service.

OBJECTS OF THE INVENTION

An object of the invention is to provide a system for transmitting digitized video graphics signals via subcarrier radio frequencies.

Another object of the invention is to provide a system for transmitting real time information to remote receivers. Users of the system have receiving units that create a visual display of weather information.

Another object of the invention is to provide real time information from different sites as the user travels from place to place. The transmission is by radio rather than telephonic.

Another object of the invention is to provide weather information to stationary or non stationary users. This information may originate from designated sources, such as NWS radar sites.

Another object of the invention is to provide a system that permits real time weather monitoring across as large a geographical area as is covered by information gathering radar. A network of conventional FM stations, capable of SCA broadcasting, participate in the system so that as a mobile receiver moves from the range of one FM station, it will enter the range of another. A tunable receiver permits the user to vary the FM frequency that is desired to be received.

Another object of the invention is to provide a receiver having a built in modem so that its input is analog, audio data and its output is TTL data.

Another object of the invention is to provide weather information that can be displayed on a conventional television display.

Another object of the invention is to provide visual weather information that is transmitted to the user at voice and data frequencies rather than at conventional television frequencies.

Another object of the invention is to permit a visual display that will be displayed even if the receiver is turned off.

Another object of the invention is to permit data processing, controllable by the user at the receiving unit, of information transmitted by secondary carrier broadcasts.

Another object of the invention is to permit information from other sources, such as LORAN, to be incorporated and displayed at mobile receiving units.

Another object of the invention is to provide weather information that is automatically updated as weather conditions change.

Another object of the invention is maintain historical weather data and permit the user to determine the movement and development of weather conditions.

Another object of the invention is to provide error checking and error correction of incoming weather data.

DESCRIPTION OF THE DRAWINGS

FIG. 9 is a flow chart of the system's DoEnd procedure.

FIG. 10 is a flow chart of the system's DoHistory procedure.

As described below, the invention is used for real time monitoring of weather information by non stationary users. Thus, in this embodiment of the invention, the user's receiving and displaying equipment is installed on a vehicle, such as an airplane or boat. It should be understood, however, that this application includes features of the invention, such as a tunability of the receiver, that may not be necessary for other applications. In other applications, the user may be stationary, such as at a facility that is weather sensitive, such as a computer processing site or an amusement park.

In all applications, an FM station is designated to participate in the system. Such stations are capable of broadcasting SCA signals, which are multiplexed on the main channel by frequency modulation of subcarriers. Detailed standards for such transmissions are in §73.319 of the FCC Rules and Regulations. In the described embodiment, there are a network of FM stations, each generally having 100,000 watts of power, giving the signal a reach of up to 200 miles at altitude. The FM station is capable of transmitting SCA transmissions at 92 kilocycles off the main carrier.

Figure 1:
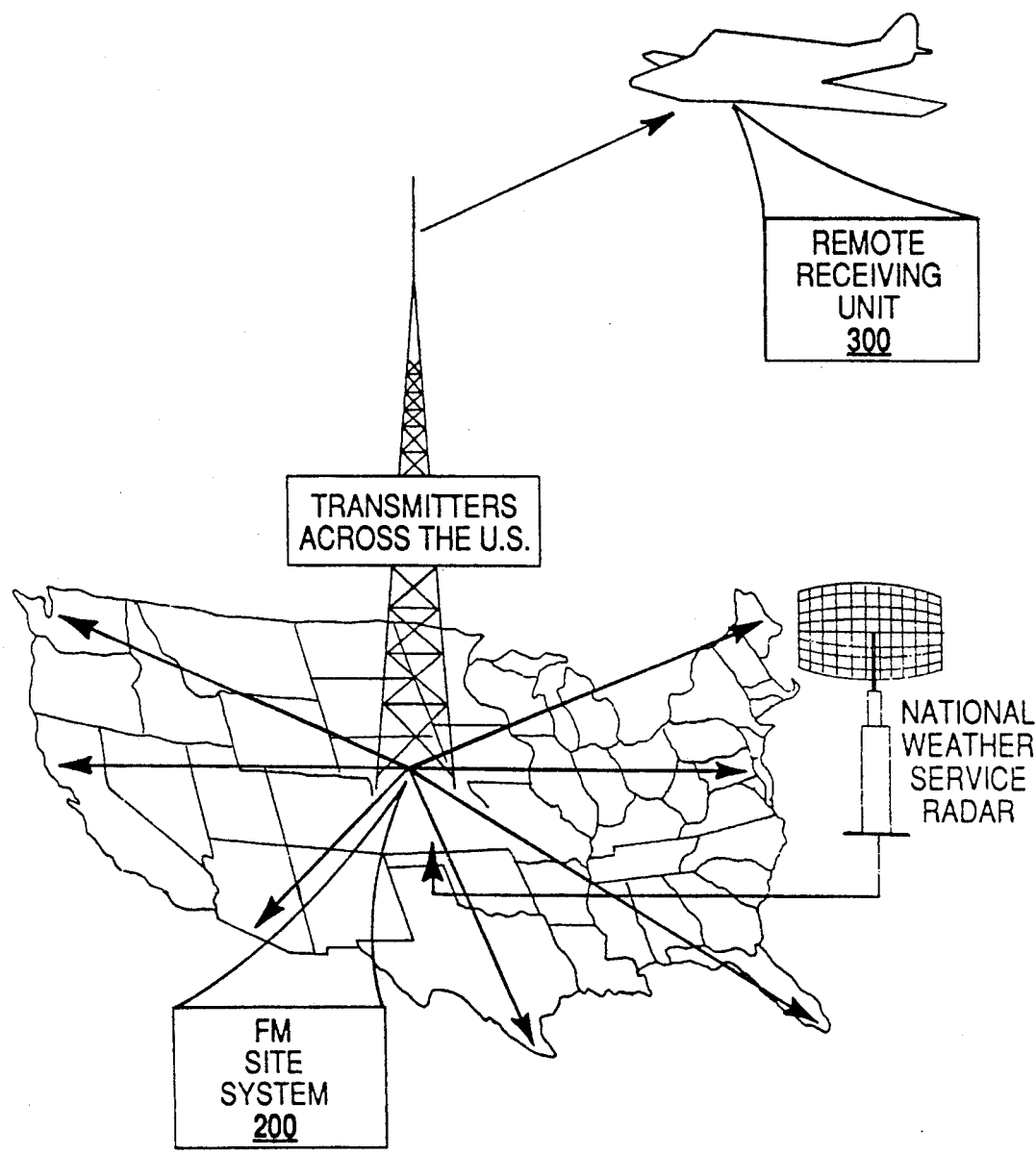
FIG. 1 is a block diagram of an overview of the invention as used for real time monitoring of weather information by a remote non-stationary user.

FIG. 1 is an overview of the communications links of a data picture from its origin at a radar receiving site to an FM station and then to a remote receiving unit. NWS radars are used to gather precipitation data. There are then two transmission steps, which connect three locations remote from each other. The first transmission step is a telephonic transmission between the originating site and an FM station. At the FM station, the data is received, processed, and transmitted by FM site system 200. The second transmission step is an FM broadcast from the FM station to the user's remote receiving unit 300.

It is important to understand the data format during the several steps of transmission and processing. At the NWS radar sites, the data begins as analog, radial scan, data. The data is then digitized for purposes of transmission to the FM site. At the FM site, FM site system 200 converts it to raster scan, rather than radial, format. A modem converts it to audio analog data, which then modulates the FM subcarrier signal. The data is transmitted by radio in a audio frequency shift keying format (AFSK). Audio frequency shift keying (AFSK) is a form of frequency modulation in which two states of a signal are transmitted as two separate audio frequencies. It is used for digital data because a predetermined audio frequency may be turned on and off by the transmitting modem as it sends a one or zero. At the remote receiving unit 300, the data is received by a tunable receiver, and then digitized by a microcomputer.

From the NWS sites, the telephonic transmission step is via a continuous dataline, namely a 2400 bits per second (bps) telephone link using Synchronous Data Link Control ("SDLC"). This is a bit-oriented protocol, developed by the IBM Corporation, in which all information fields are 8 bits long. Information is sent by frames and within each frame are fields having specific functions. A message synchronization indicator, or flag, is generated by a hardware circuit. Other circuits prevent data from being transmitted from having the same pattern as the flag. This protocol and others functionally equivalent are well known in the art. The form of the data is digital in the sense that each pixel displayed at the radar site is transmitted as an 8-bit digital word. The digital words are transmitted in radial arcs, with a revolution of 360 degrees required to make up a complete map.

Figures 2, 3:
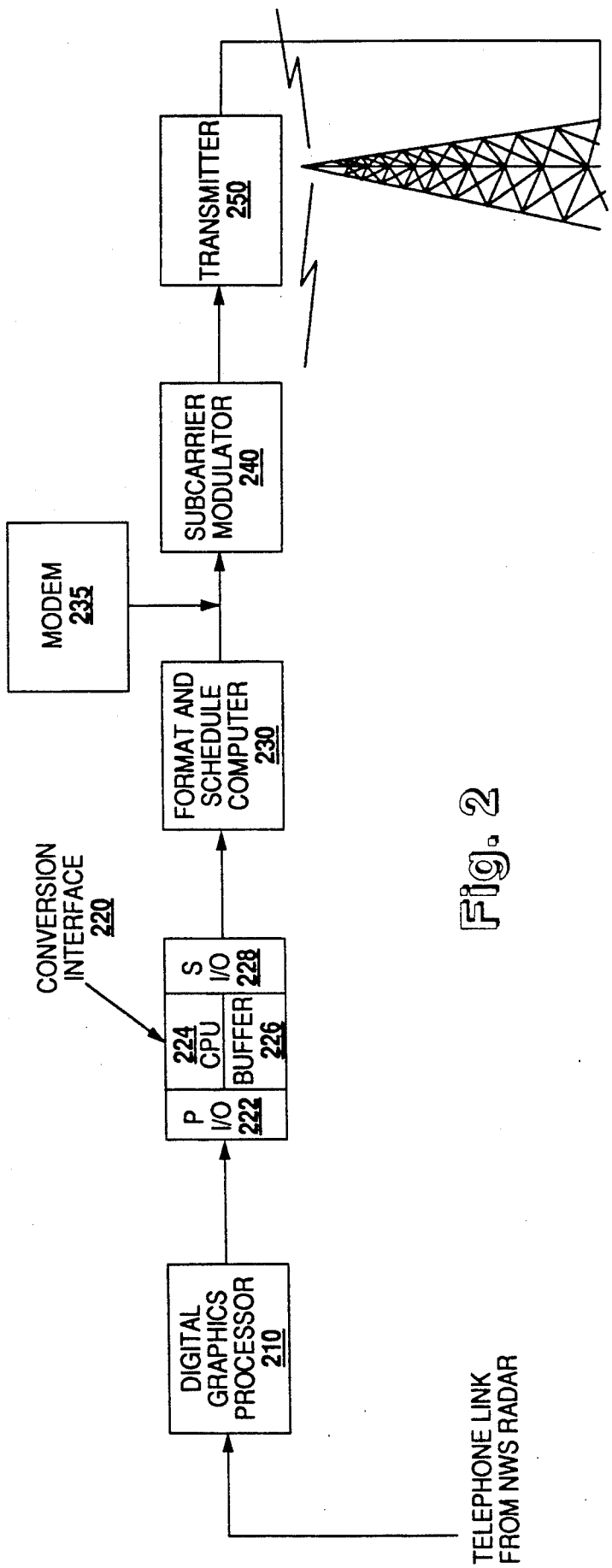
FIG. 2 is a block diagram of the equipment used at the FM station site.
FIG. 3 is a block diagram of the remote receiving unit.

FIG. 2 shows the equipment used at the FM station site. Digital graphics processor 210 receives the NWS data, which is in radial arc format. It converts this data to raster format and adds geophysical information, such as geographic boundaries and VOR references. In the preferred embodiment, the radial arc equipment used to transmit the data from the NWS site and the digital graphics processor 210 used to receive the data at the FM station is manufactured by Alden Electronics, Inc.

An important function of digital graphics processor 210 is compaction of radar data. Radar data for a complete map has 320 pixels per line, with 240 lines. As received by digital graphics processor 210, the data requires a substantial amount of storage as well as transmission time. To reduce the amount of data required to be transmitted, digital graphics processor 210 executes a program using run line encoding to reduce the amount of data for each map. The program first counts the number of contiguous pixels of one color for each line. When a each new color begins on a line, the program begins a new count. For example, the first 20 pixels of a line might be: 5 blue, 11 yellow, 4 red. Rather than 20 bytes, only 3 bytes are required to be transmitted. In each of these 3 bytes, the first 3 bits contain the color. The fourth bit designates the type of map delivered from digital graphics processor 210. The next 4 bits permit up to 16 pixels of a single color to be designated. Thus, for the example above, the last 4 bits of each of the 3 required bytes would be, in binary, 0101, 1011, and 0100, respectively. For every 16 continuous pixels, one byte is required. Thus, if there are 16-32 continuous pixels of a single color, 2 bytes are required. Each of the 240 lines is compacted in this manner.

After digital graphics processor 210 obtains and processes each 360 degree sweep of data, it dumps the data to format and schedule computer 230 via conversion interface 220. Conversion interface 220 is a standard parallel-to-serial converter buffer box, which is commercially available. As shown in FIG. 2, the components are parallel input/output 222, buffer 226, and serial input/output 228, and depending on the type of buffer box, a CPU 224 may also be included.

At conversion interface 220, the data is converted from Centronics parallel format to serial format conforming to the RS-232 C standard. This is the standard of the Electronics Industries Association, and its proper name is "Interface Between Data Terminal Equipment and Data Communication Equipment Employing Serial Binary Data Interchange". There are 8 bits per word, with no parity bit and one stop bit. The transmission rate from conversion interface 220 to format and schedule computer 230 is 1200 bps.

The data out of digital graphics processor 210 has a specific format, in hexidecimal code, that is maintained for purposes of processing at the receiving unit 300. Each header begins with 00 FF. The next character is a control code, such as to indicate whether a map is beginning, ending, or in process. For example, 05 indicates that a new map is beginning and 13 indicates that a map is complete. Thus at the beginning of a new map, the code is 00 FF 05. Eight bytes follow, which may contain selected information, such as the time and date. Then there are 240 map lines, each line having the code 00 FF 04 [ln], where ln is the line number. After 240 lines, the code is 00 FF 13 13, which signals the end of a map.

These control codes and others are maintained during radio transmission for purposes of processing the data at the receiving unit 300. The following Table 1 lists these control codes and gives a brief description of the data they identify:

Table 1: Control Codes

00—Synch one
04—Data
05—Status
13—End of radar data
19—History end
20—Start of radar history map 0
21—Start of radar history map 1
22—Start of radar history map 2
23—Start of radar history map 3
E2—Recall
E3—Recall
E4—Recall
FF—Synch two These codes will be further explained in connection with the parts of the invention that make use of them.

Format and schedule computer 230 is a standard microcomputer, and in the preferred embodiment is a compatible with or is an IBM PC, manufactured by the IBM Corporation.

Periodically, format and schedule computer 230 saves data comprising a complete map, or frame. A designated number of frames are saved in this manner. After the designated number of frames are saved, when a new period begins, a new frame is saved and the oldes frame is deleted. In the preferred embodiment, the period is 30 minutes and the designated number of frames to be saved is four. A time window is provided within each 30-minute period to ensure that a new historical map is saved. Thus, a two-hour history, comprised of four historical maps, is recorded. Table 1 shows the hex codes used to identify the start of the four radar history maps and the history data end.

Another important part of format and schedule computer 230 is programming that schedules the sending of one real time map and four historical maps at periodic intervals. Thus, each transmission includes one "real time" map and 4 historical maps. The data referred to as "real time" is actually about 4 to 7 minutes behind because of transmission delays.

Format and schedule computer 360 also is comprised of programming that further compacts the 4 historical maps. This is accomplished with a prioritization algorithm. Colors are prioritized into levels of intensity. In the preferred embodiment, there are 6 colors, or levels 1-6, and a level for geopolitical boundaries. The algorithm first selects an area of the map to be displayed, which, in the preferred embodiment, begins at row 24. Within this reduced frame, a small area is selected, which, in the preferred embodiment, is 3 rows down and 2 pixels across, making a square of 6 pixels. The algorithm then selects the highest color level in that 6-pixel square. Boundaries are a high level and are stripped. The 6 colors are prioritized to 4 colors. The selection routine is described below:

| | |
|---|---|
| if highest is "boundary" | strip |
| if highest is 1 or 2 | select 2 |
| if highest is 3 or 4 | select 3 |
| if highest is 5 or 6 | select 6 |

From format and schedule computer 230, the data passes to an SCA subcarrier modulator 240, where the data modulates a subcarrier signal, thereby converting the digital codes into signals that can be broadcast by radio. Modulator 240 delivers a signal at 92 kilohertz to FM transmitter 250.

From transmitter 250, the data is transmitted one line at a time at a rate of 1200 bps. In the preferred embodiment, approximately 90 seconds are required to transmit one frame. This time period varies according to how much information is in each map. Each time a new map is transmitted, the four historical maps are also transmitted.

As shown in FIG. 3, receiving unit 300 can be illustrated as four basic blocks: antenna 310, receiver 320, computer 360, and display 390. These units can be portable, for example by being mounted in an instrument panel or carried as a hand portable unit.

Antenna 310 picks up the subcarrier signal. In the preferred embodiment, antenna 310 is an FM antenna, although an existing antenna, such as a VOR antenna on an aircraft, may be used.

Apart from antenna 310, receiving unit 300 is specially designed to be small in size, which facilitates its mobility. In the preferred embodiment, receiver 320, computer 360, and display 390 may be conveniently installed in an avionics instrumentation stack.

Display 390 is a conventional CRT display. It displays varying degrees of green, yellow, tan, and red using the VIP standard, according to the intensity of the storm. There are six levels of intensity each represented by a different color. The screen size of display 390 is 192 by 256 pixels.

Figure 4A:
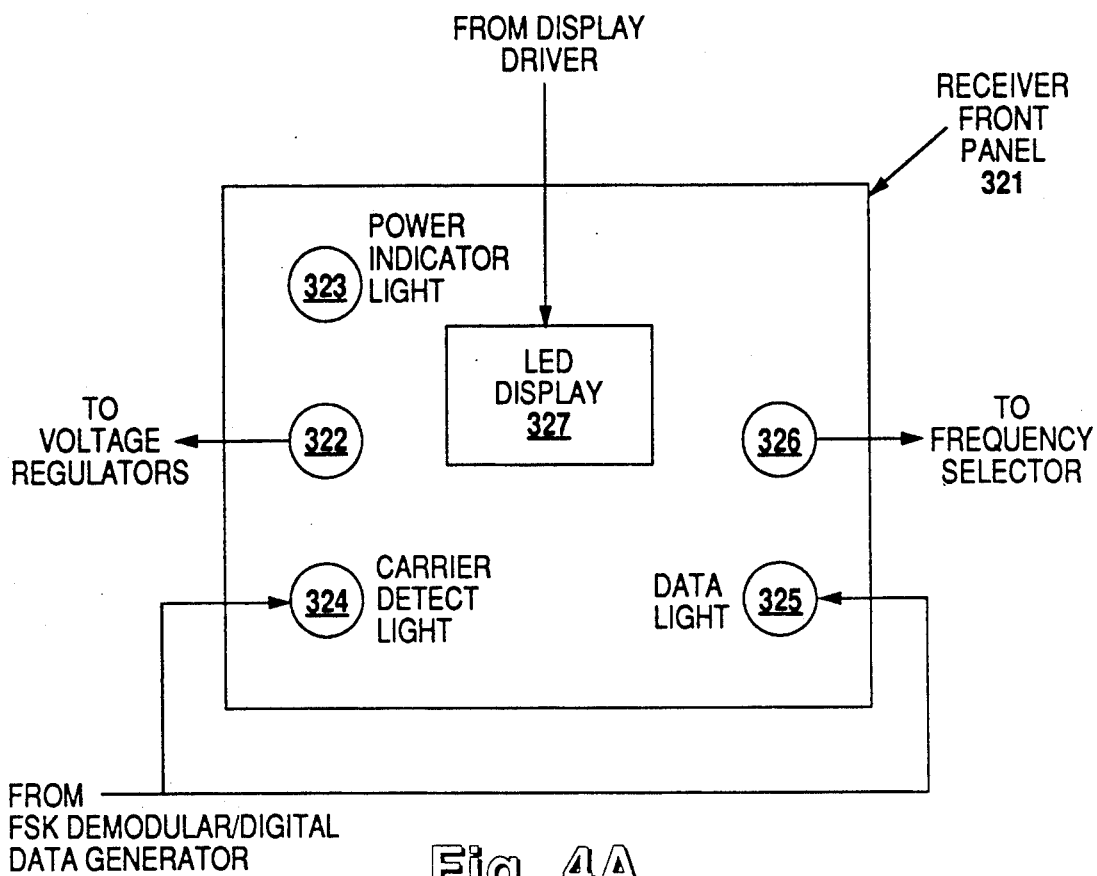
FIGS. 4a and 4b are front views of the front panel and controls for the receiving unit shown in FIG. 3.
Figure 4B:
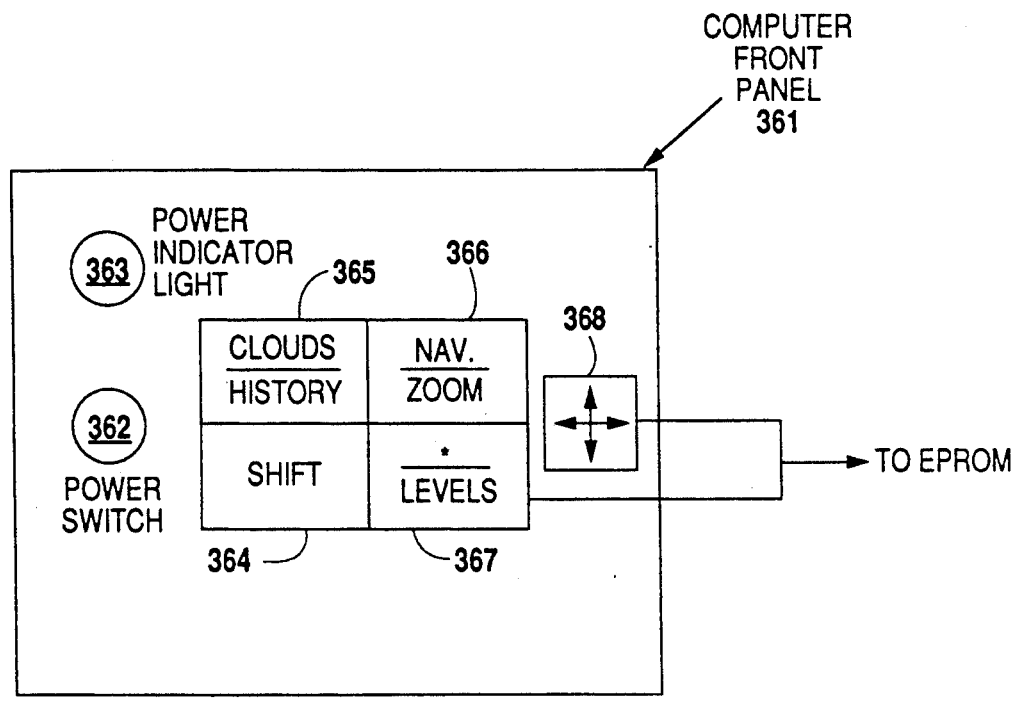

FIGS. 4a and 4b show the control panels of receiver 320 and computer 360, respectively. Power is supplied from a standard DC source at 12 volts, and is controlled by means of switch 322 on control panel 321 of receiver 320 and by switch 362 on control panel 361 of computer 360. Power indicator lights 323 and 363 inform the user whether power is being delivered.

Receiver control panel 321 also includes a carrier detect light 324 and a data light 325 to indicate whether a carrier signal is being detected and whether data is being transmitted. Receiver control panel 321 also includes a toggle switch that permits the user to vary the frequency to which receiver 320 is tuned. A conventional seven-segment, four-digit, LED display 327 displays the channel to which receiver 300 is tuned.

Computer control panel 361 also includes four selection keys 364-367 and a cursor key 368. A first selection key 364 is a shift key, which permits the other three selection keys to have two functions, depending on the state of the shift key. A second selection key 365 permits the operator to view either historical weather data, or other types of data such as cloud cover that may be added as an improvement to the invention. A third selection key 366 permits the operator to zoom in or out of a screen or to call navigational programming procedures. A fourth selection key 367 permits the user to mark points on the map or to strip levels of color on display 390. By using these keys, the display may be zoomed in or out, scrolled, viewed in a time lapse historical sequence, or levels of precipitation may be wiped away. These functions will be further explained below in connection with the appropriate system programming procedures.

Cursor key 368 permits the user to move a cursor on the screen and to scroll the display. Scrolling is provided when a complete map is larger than what can be displayed on display 390. In the preferred embodiment, an entire map is 240 by 320 pixels, which is larger than the 192 by 256 pixel size of display 390. Thus, not all of a complete map can be viewed at once. If the user moves the cursor toward a boundary of the display 390, a new window will be displayed and the screen will refresh with a new map. This scrolling feature is provided for both color and monochrome map types, as explained below in connection with the appropriate system programming procedures.

Figure 5:
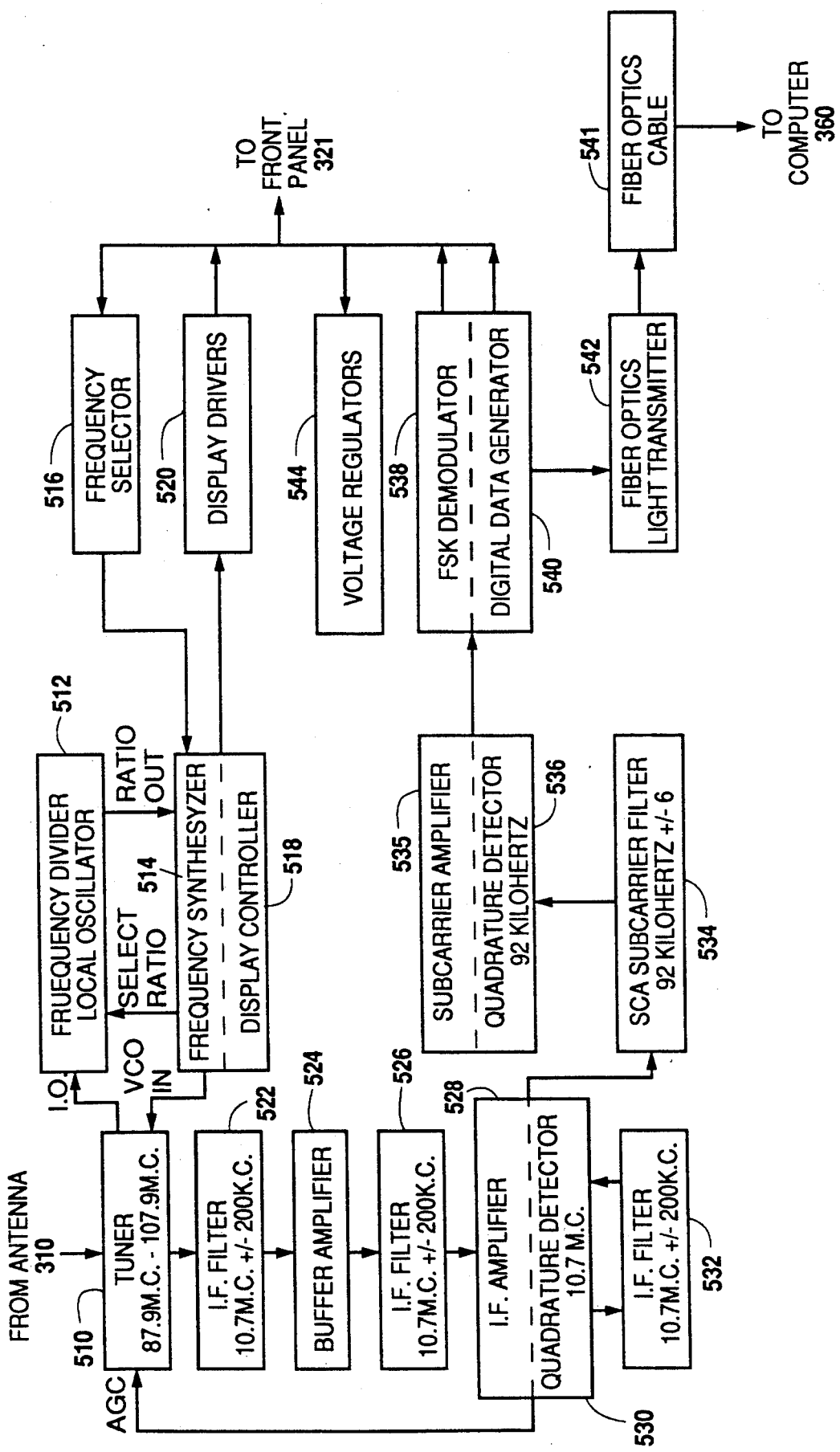
FIG. 5 is a block diagram of the receiver shown in FIG. 3.

As shown in FIG. 5, receiver 320 and computer 360 are made of a number of components. For purposes of describing the preferred embodiment, several commercially available components are identified below by manufacturer and number, but other components similar in function may be substituted.

As explained below, receiver 320 is a tunable SCA subcarrier receiver. It is designed to filter a 92 kilohertz subcarrier component contained in a main audio carrier signal. Intermediate frequency ("IF") filters 522 and 526 first obtain a signal at 10.7 megahertz. A subcarrier filter 534 then obtains a 92 kilohertz signal.

Receiver 320 is designed to have a minimum of noise, as well as being small in size. The entire receiver circuit is mounted on a single printed circuit board (not shown). Receiver 320 is shielded by means of its container (not shown) and by making the printed circuit board (not shown) multi-layered. This printed circuit board has four planes, with circuitry on planes 2 and 3. A conductive ground mesh is laid on planes 1 and 4.

As shown in FIG. 5, tuner 510 receives signals from antenna 310, and is tunable from 87.9 to 107.9 megacycles. Tuner 510 operates in conjunction with the local oscillator, frequency divider 512 and frequency synthesizer 514. The local oscillator 512 is tuned by a control signal from the frequency synthesizer 514.

Frequency selector 516 permits the operator to select a frequency, according to the radio station whose signal is sought to be received. Frequency synthesizer 514 receives this information from frequency selector 516 and sends control signals to frequency divider 512, which then modifies the local oscillator output. From these inputs, frequency divider 512 delivers a signal to frequency synthesizer 514. After analyzing the this signal, frequency synthesizer 514 then delivers a control voltage to the local oscillator.

In the preferred embodiment, frequency synthesizer 514 is combined in a single integrated circuit with display controller 518. The signals generated by frequency synthesizer 514 are converted by display controller 518 to standard seven-segment LED display signals. These signals pass to display drivers 520, which amplify the signals to turn on the LED lights in LED display 327. The component used in the preferred embodiment is the uPD1701, manufactured by the NEC Corporation.

From tuner 510, the signal is filtered by a first IF filter 522. The signal then passes through a first buffer amplifier 524 and a second IF filter 526. Although not shown in FIG. 5, a third IF filter and second buffer amplifier are added in the preferred embodiment, thereby passing the signal through three filter stages rather than two, prior to being delivered to IF amplifier 528. The IF filter and amplifier components of receiver 320 perform single conversion superheterodyne techniques. A 10.7 megacycle signal is selected, having a width of plus or minus 200 kilocycles.

The data then passes to an IF amplifier 528 and an fm detector 530. In the preferred embodiment, fm detector 530 is a quadrature detector 530. The significant features of detector 530, as opposed to some other forms of detectors are noise suppression, good signal quality, and a relatively wide bandwidth.

At IF amplifier 528, a DC gain control signal proportional to the amplitude of the RF component is fed back to tuner 510. This permits automatic gain control, or AGC, to be achieved. If the signal strength at the RF input rises to a point where it could cause cross modulation, then feedback via the AGC line automatically reduces the amount of signal entering at tuner 510.

Feedback filter 532 is a tuned tank circuit, used to create a phase shift of 10.7 megahertz IF signal proportional to the frequency shift of the 10.7 megahertz signal. This signal shifted an additional 90 degrees is then multiplied with the original 10.7 megahertz signal to create a signal proportional to the frequency shift of the main carrier.

The signal passes from detector 530 to SCA subcarrier filter 534, which extracts the 92 kilohertz signals, with a width of plus or minus 6 kilohertz. The signal then passes to subcarrier amplifier 535 and quadrature detector 536.

From quadrature detector 536, the signal passes to FSK demodulator 538 and digital data generator 540. These components convert the signal from frequency shift keyed form to digital codes. Control signals from these components determine whether the carrier detect light 324 and data light 325 on front panel 321 will be "on".

The digitized data is then transmitted to computer 360 by means of fiber optics light transmitter 542. This receiver-to-computer transmission means is desirable because it is immune to common mode interferences. A standard fiber optic cable 541 carries data from receiver 320 to computer 360.

Figure 6:
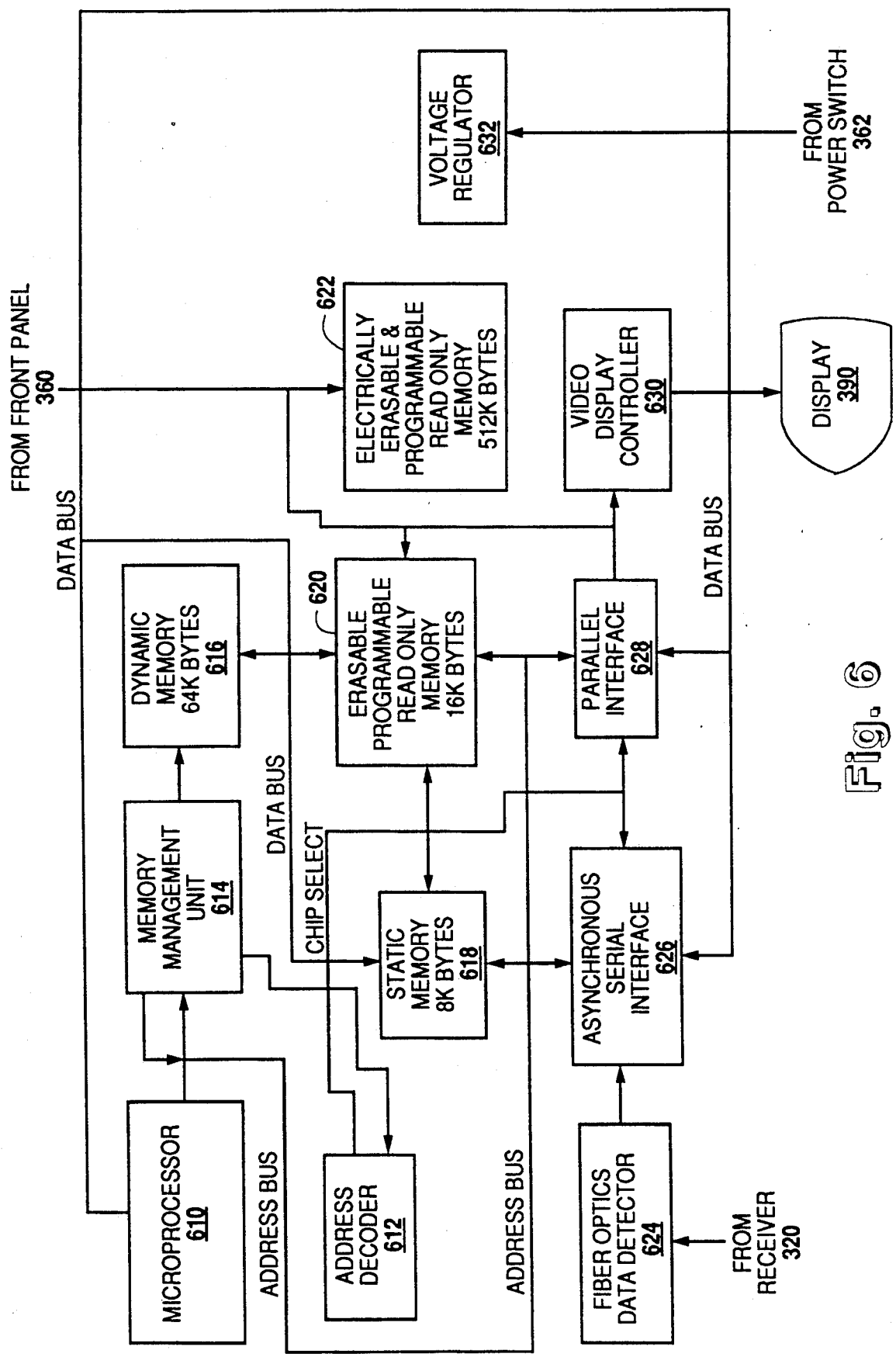
FIG. 6 is a block diagram of the computer shown in FIG. 3.

Computer 360 is shown in further detail in FIG. 6. It is microprocessor-based, microprocessor 610 having 64 kilobytes of linear addressing capability, with a memory management unit giving it 96 kilobytes of addressability. In the preferred embodiment, microprocessor 610 is a commercially available unit, such as the MC6809 8-bit microprocessor manufactured by Motorola, Inc.

Computer 360 includes conventional data and address busses. An address decoder 612 interprets address codes and delivers the stored information. Computer 360 also includes a memory system comprised of various memory devices, whose use depends on whether the memory is to be read only or random access and whether it is to be dynamic or static. This is a multilevel memory structure, in which a virtual or cache memory holds portions of the programming and data as needed, with a secondary memory for storing the remainder of the programming and data.

This memory system includes a memory management unit ("MMU") 614, whose main function is to control address lines for the video display controller and microprocessor and permits both to have direct memory access. MMU 614 is a conventional unit, comprised of a number of well-known components (not shown). One such component is a synchronous address multiplexer ("SAM") chip, which in the preferred embodiment is an MC6883 chip manufactured by Motorola, Inc. Additional components are typical of conventional microcomputers, and include commercially available chips having the reference numbers 74LS156, 74HC00, 74HC541, and 74HC53, which create various control signals. The memory devices include dynamic and static memory and read only memory. Dynamic memory 616 stores bits in the form of electric charges. In the preferred embodiment, dynamic memory 616 is capable of storing 64 kilobytes of data. Static memory 618 stores bits in flip-flops, and has a capacity of 8 kilobytes. The preferred embodiment also includes erasable programmable read only memory ("EPROM") in which the system programming is stored. There are two EPROM's, one being electrically erasable and the other being erasable by the more conventional means of ultraviolet light. Thus, an EPROM 620 has a capacity of 16 kilobytes, and an electrically erasable and programable read only memory ("EEPROM") 622 has a capacity of 512 bytes.

An advantage of EEPROM 622 is that it can be programmed and erased while still within the circuit of the system. This permits the system programming to be updated and modified in circuit and permits a remote receiver to be addressable by code so that record keeping can be maintained on a per user basis.

Computer 360 receives incoming data from receiver 320 by means of fiber optics data detector 624. The data then passes to asynchronous serial interface (ASI) 626, which is in communication with microprocessor 610. ASI 626 provides data formatting and control to interface serial asynchronous data communications information to bus organized systems. ASI 626 is a commercially available component, commonly referred to as an asynchronous communications interface adapter.

Parallel interface 628 is also in communication with microprocessor 610. It provides the means for interfacing peripheral equipment to microprocessor 610. It is a commercially available component such as the MC6821, manufactured by Motorola, Inc.

The output of parallel interface 628 goes to video display controller (VDC) 630, which also receives instructions from the data bus. The output of parallel interface 628 also goes to EEPROM 622, thereby permitting data in EEPROM 622 to be electically altered. VDC 630 reads data from the memory devices and generates a graphic display on display 390. VDC 630 is a commercially available device, such as the MC6847 manufactured by Motorola, Inc.

As shown in FIGS. 4 and 5, the circuits of both receiver 320 and computer 360 include voltage regulators 544 and 632. Conventional devices may be used for this purpose to prevent changes in operating voltage from causing false signals, which may interfere with operation of component parts.

To use the invention, the user simply turns power on to receiver 320 and computer 360 by switching the appropriate power switches on front panels 321 and 361. The user then tunes receiver 320 to an appropriate channel, using frequency selector 326. Maps are then displayed and automatically updated on display 390 as determined by the system programming. The user may also select various modifications to the display by executing various programming procedures. All user input is through the selection keys 364-367 and cursor key 368.

Figure 15:
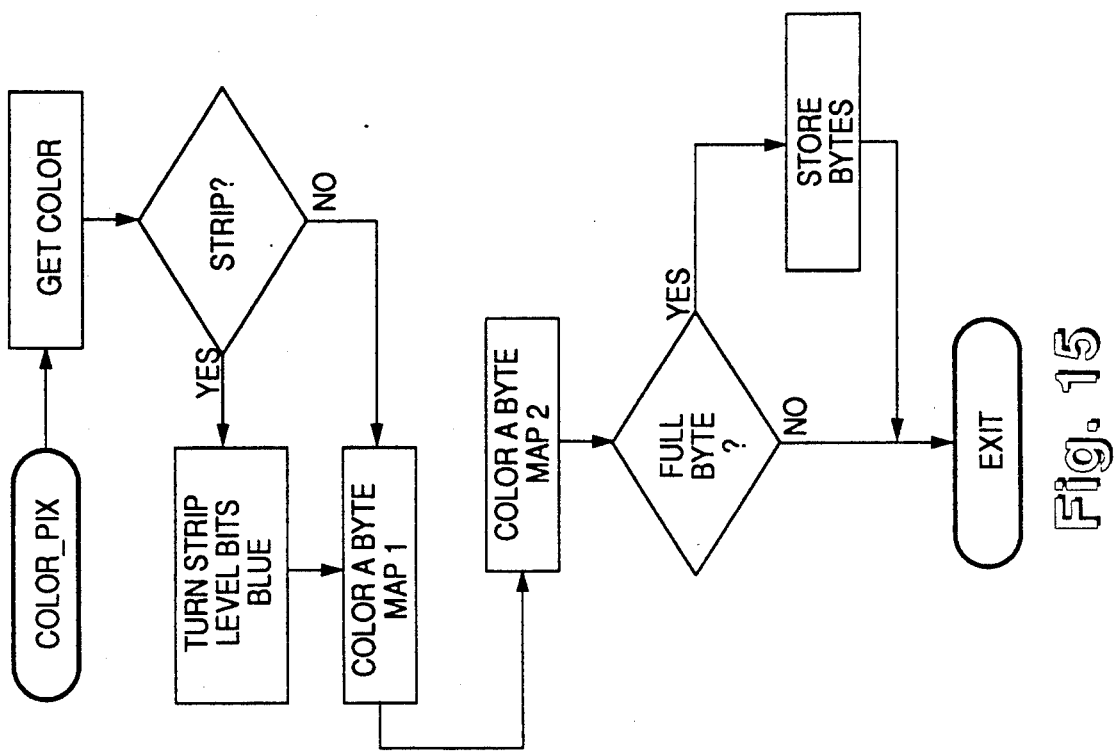
FIG. 15 is a flow chart of the system's ColorPix procedure.
Figure 16:
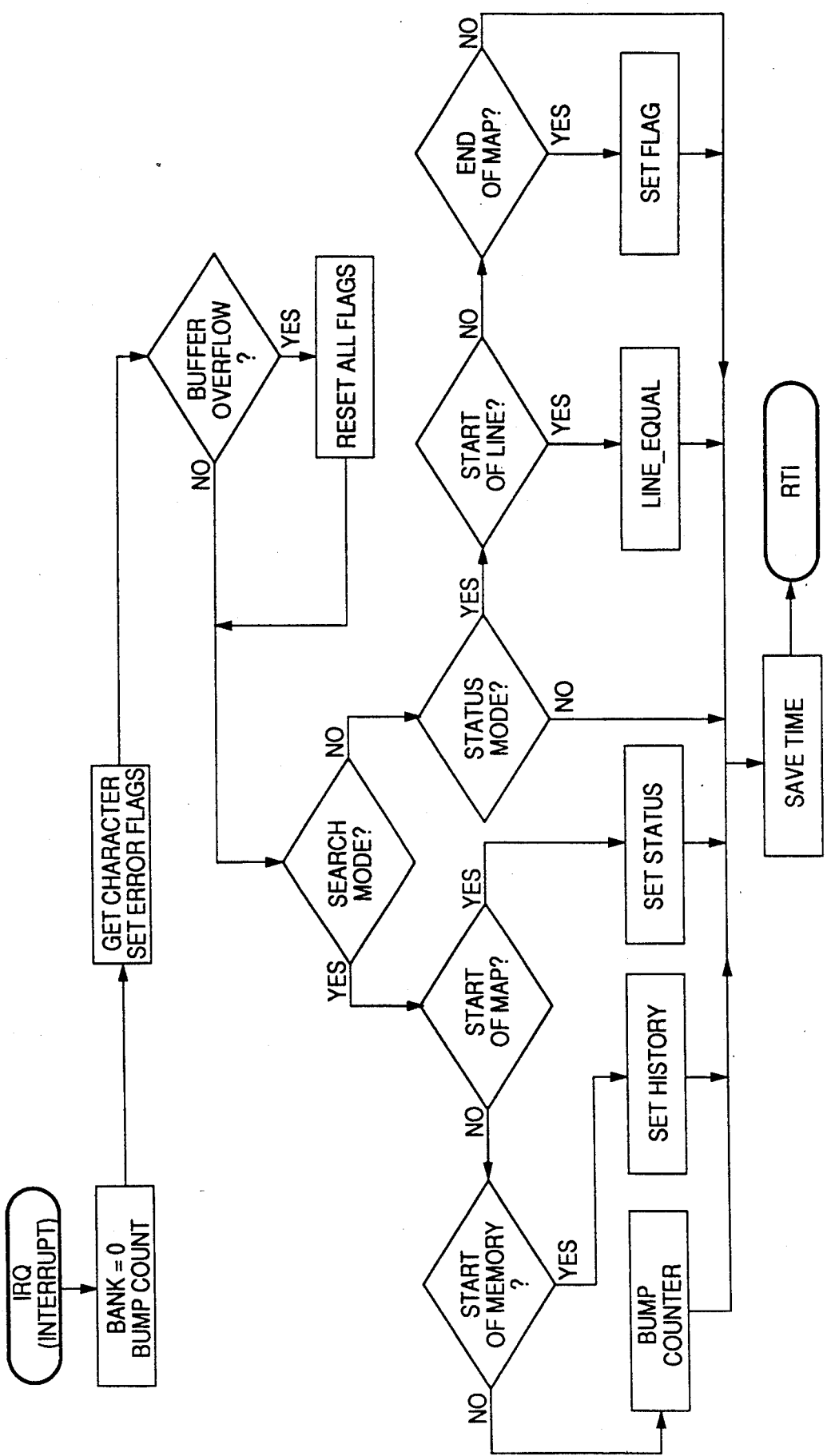
FIG. 16 is a flow chart of the system's IRQ interrupt.
Figure 18:
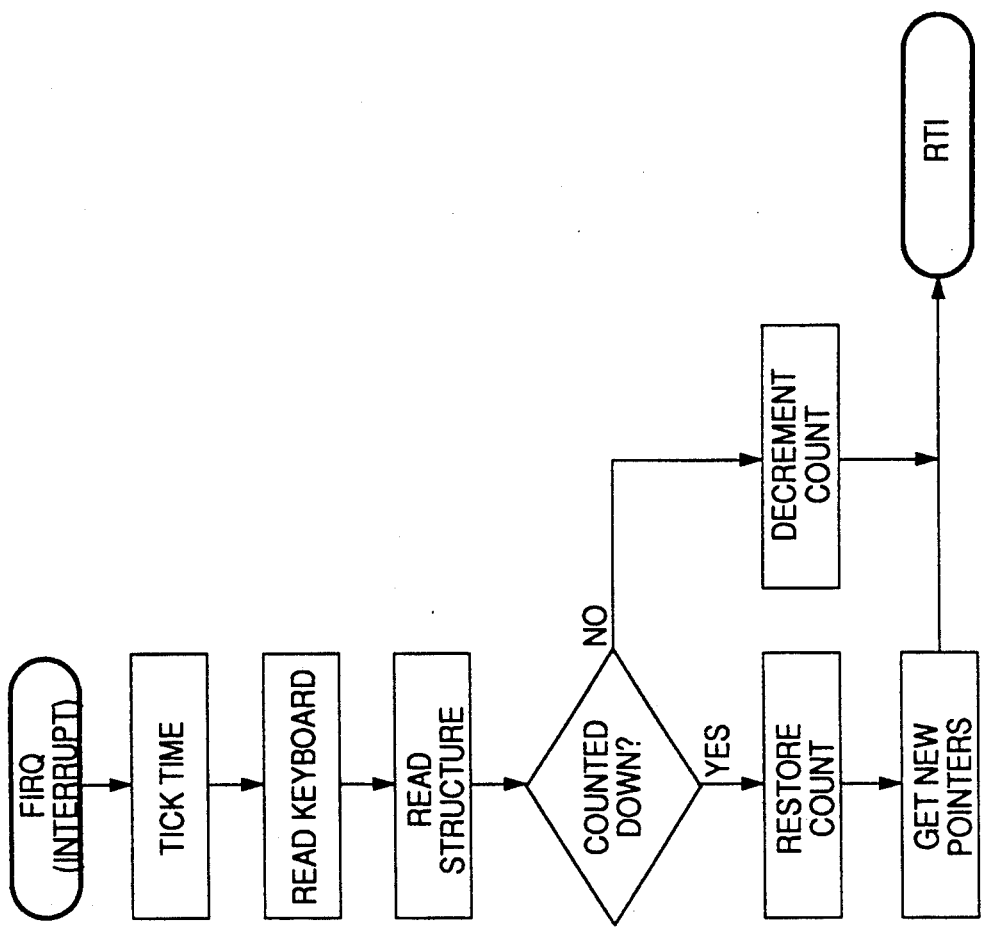
FIG. 18 is a flow chart of the system's FIRQ interrupt.

The system programming is illustrated in FIGS. 7 through 18. In the preferred embodiment, the programming is written in the C language. Each C program is comprised of one or more procedures, which are illustrated in FIGS. 8 through 15 and FIG. 17. One procedure may call another, and procedures may be nested. The system programming is interrupt driven, meaning that the critical procedures that synchronize operation are selected by the interrupts. FIGS. 16 and 18 illustrate the two interrupts. As explained below, one interrupt is initiated by incoming data, and the other by a field sink from VDC 630.

Map.type is a global parameter that determines the mode of map display that is being displayed on display 390, such as scroll, historical, or navigational. The map display is in color except when the user is in the navigational mode, which is in monochrome.

The system programming is designed to ensure that a good map is continuously displayed and updated regularly, but also permitting the user to control the various modes of display. Thus, throughout the system, various flags are set to direct decisions in the procedures and interrupts. "Bad flags" are set to indicate maps having errors. An "Aids" flag is set when the user selects the navigational procedure DoAids, so that any procedure executed during that mode will return to the navigational procedure without repixeling display 390. This permits the user to maintain a map upon which navigation information has been drawn. A "Character Boundary" flag indicates the relationship between the count in the map data and the number of pixels available on display 390. Other flags are described below.

Figure 7:
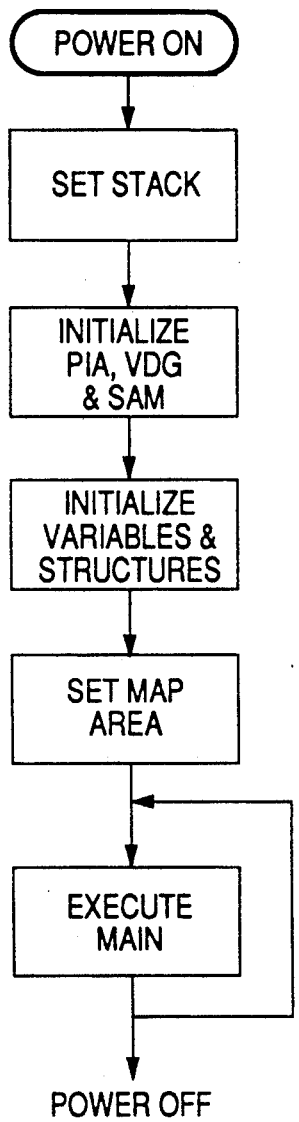
FIG. 7 is a flow chart of the power on procedure controlling the computer shown in FIG. 6.

FIG. 7 illustrates the power-on program. First, a memory stack is set. Then, the peripheral interface adapter, the video display generator, and the synchronous address multiplexer are initialized. Next, variables and structures, a type of C program variable, are initialized. Map areas are set. The last step is to call and execute the main applications programming, or Main.

Figure 8:
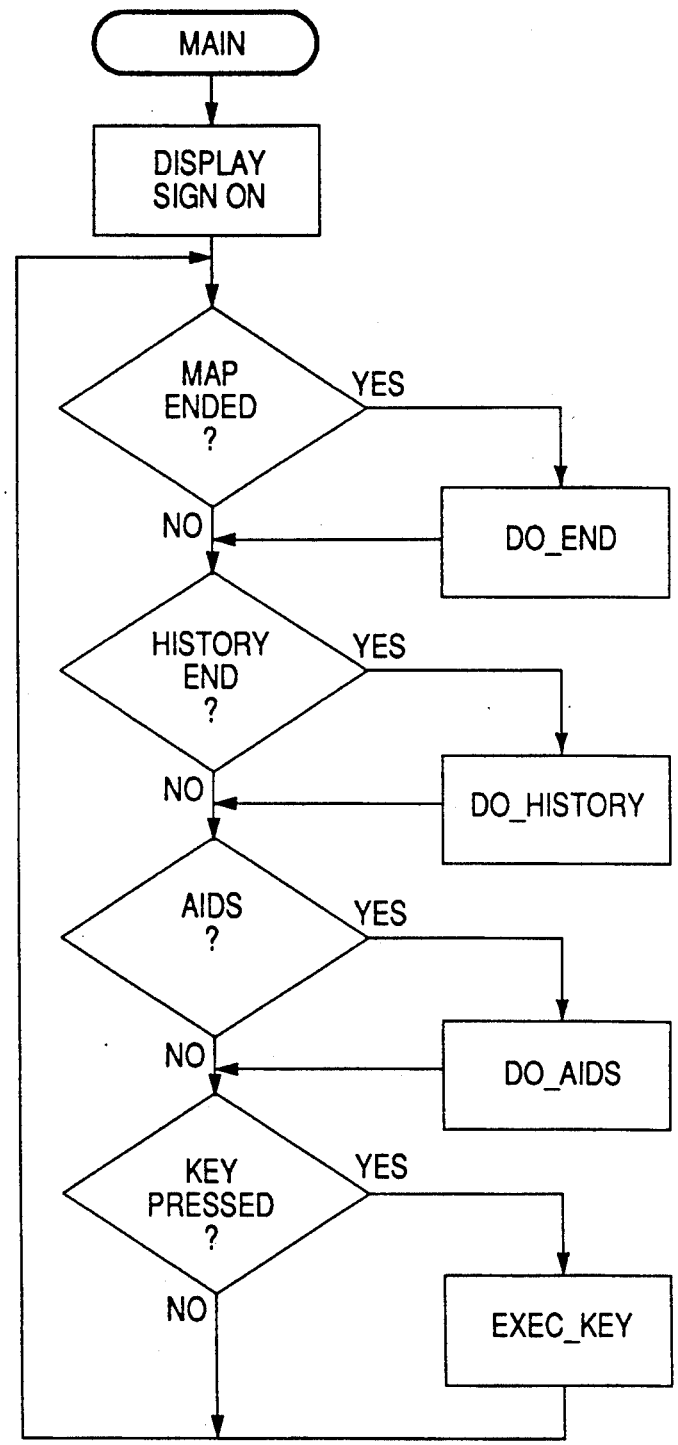
FIG. 8 is a flow chart of the system's main program procedure.

Main is illustrated in FIG. 8, consistent with the C programming requirement that each program have a function named Main. The first action is to display a sign-on message, which communicates information about the system to the operator. Specifically, the display sign-on is a legend on display 390 that informs the user that there is an incoming map. Main calls four procedures: DoEnd, DoHistory, DoAids, and ExecKey, depending on the decision steps shown in FIG. 8. If no procedure is called by the decision steps, Main continues to display the same map, but will update the map when new data is received.

DoEnd is bypassed until a map end signal is received from computer 360. A map end signal is generated by computer 360 under two circumstances. First, a map end signal may be received by the control code 13 in incoming data. Second, a map end signal is "forced" if a predetermined amount of time passes and a complete map is not received. An example of this second situation might occur if an airplane carrying the receiver banked and did not receive a complete map. In the preferred embodiment, this time period is 8.5 seconds.

As shown in FIG. 9, if called by Main, DoEnd first computes the status of the incoming map. If the map status is not good, a bad flag is set and DoEnd returns to Main. If the map status is good, the map is moved to the dynamic memory 616 of computer 360. It may then be used to generate a display. At this point, DoEnd determines whether the user has selected navigation aids and is currently in that mode. This determination is made by reading the Aids flag. If the Aids flag is set, DoEnd exits and no new map is drawn. If the Aids flag is not set, DoEnd calls ExecKey. This permits the new map to be displayed in whatever mode is currently selected by the user.

Referring again to FIG. 8, DoHistory is bypassed until a history end code is received. As shown in FIG. 10, if called by Main, DoHistory calculates the map location. It then moves the historical maps to dynamic memory 616. After these steps are performed, DoHistory returns to Main.

Referring again to FIG. 8, DoAids is bypassed in Main until the user selects navigational aids by pressing shifted selector key 366. DoAids is illustrated in FIG. 10. Generally, DoAids permits non-stationary users to navigate a course. DoAids accepts input from front panel 361, in particular, from the cursor direction key 368 and shifted select keys 366 and 367. Shifted key 366 calls the DoAids procedure. Using shifted key 367, the user may mark any two points on display 390 and a line will automatically be drawn between them. DoAids also calculates the distance between these points.

Figure 11:
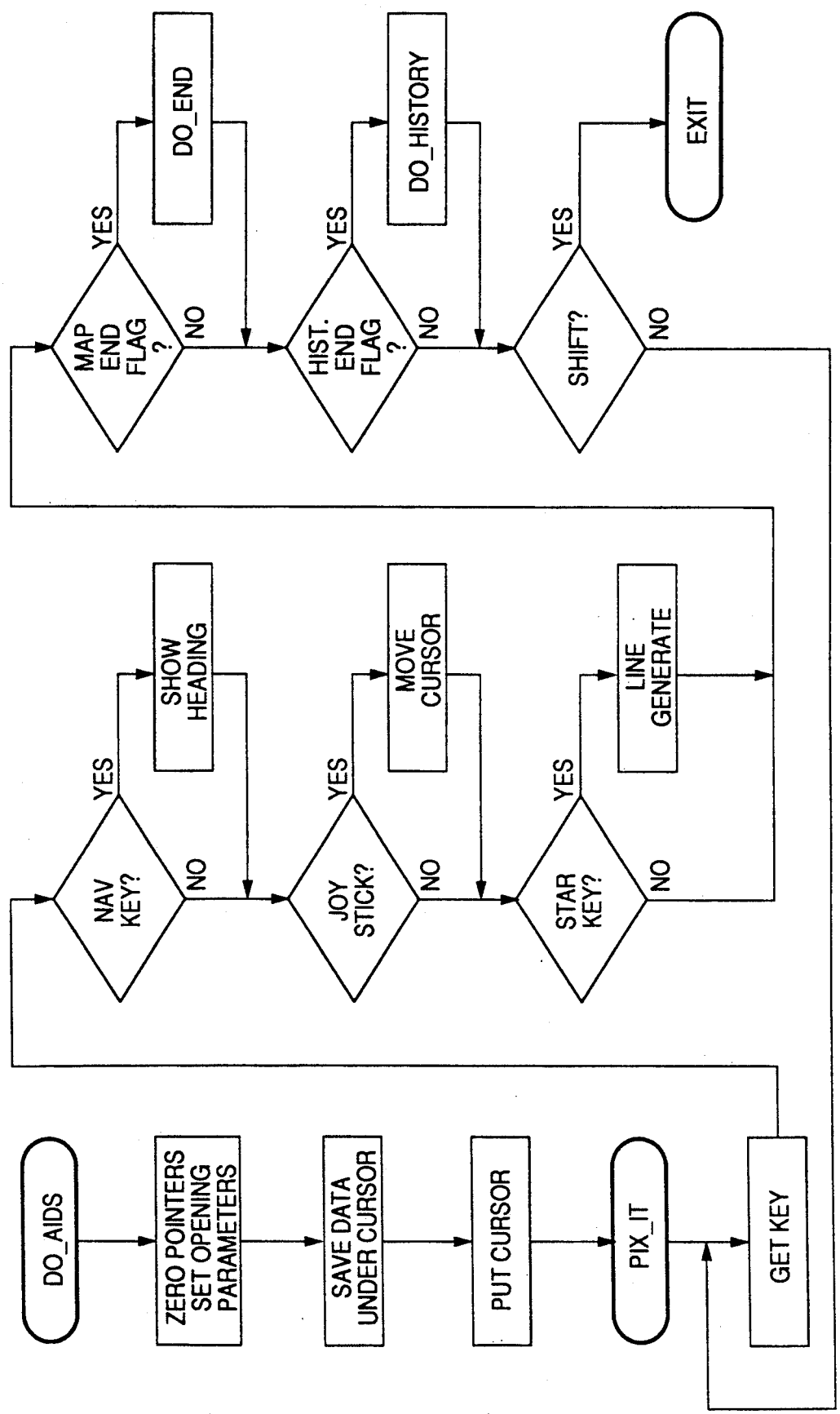
FIG. 11 is a flow chart of the system's ExecKey procedure.
Figure 13:
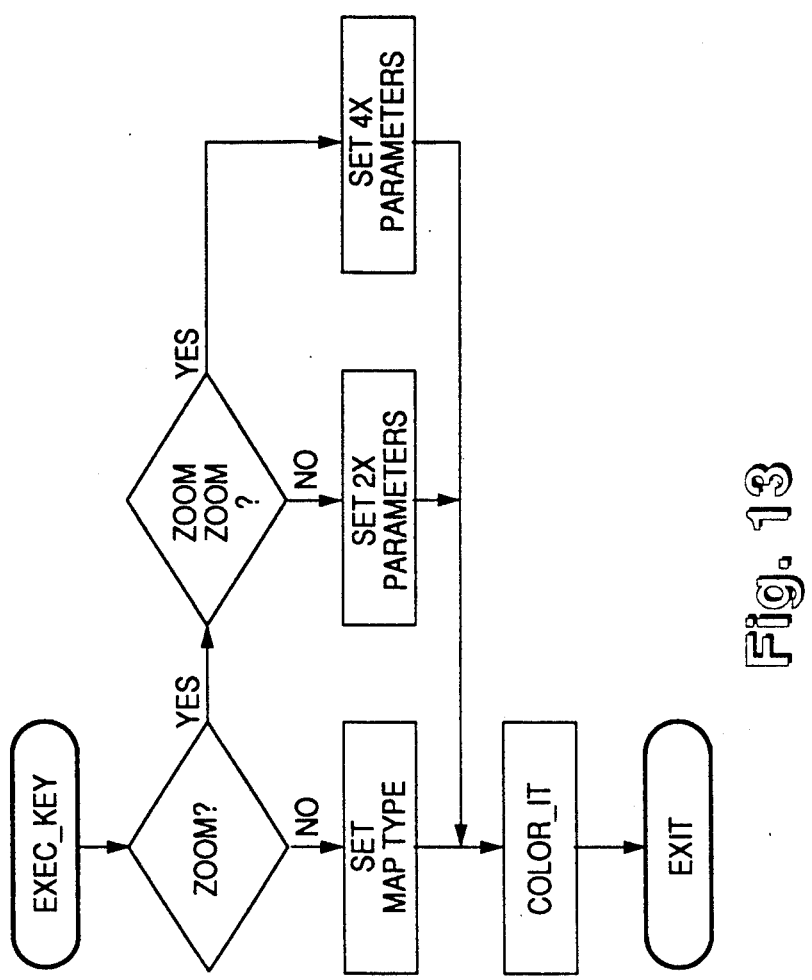
FIG. 13 is a flow chart of the system's PixIt procedure.
Figure 12:
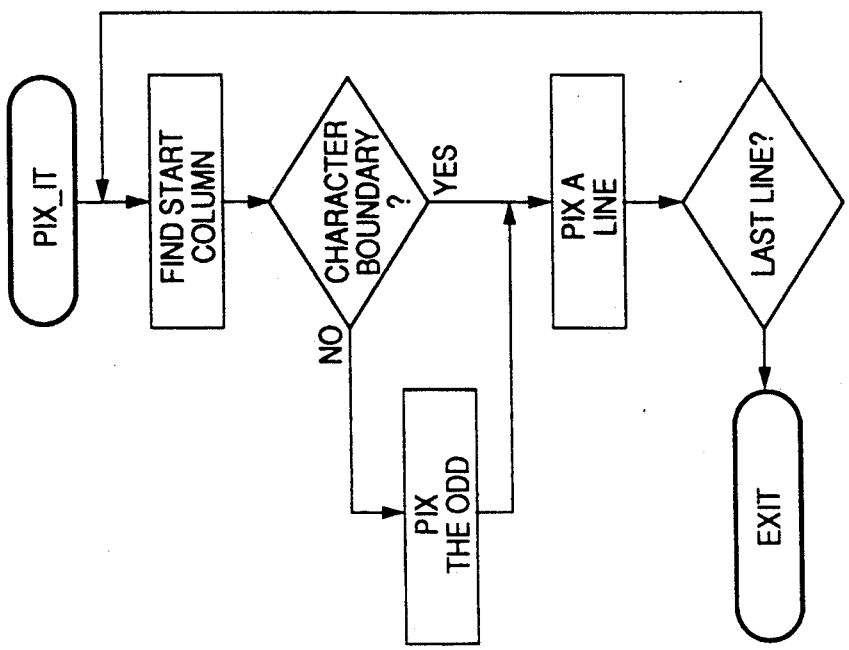
FIG. 12 is a flow chart of the system's DoAids procedure.

DoAids calls PixIt, which as shown in FIG. 11, generates the display in monochrome on display 390. PixIt detects a Character Boundary flag, and if that flag is set, a nested loop decides what to do with extra bytes. PixIt executes one loop per line until a last line code is detected.

Referring again to FIG. 8, ExecKey is bypassed in Main until a KeyPressed signal is received from front panel 361. ExecKey may also be called by DoEnd, as shown in FIG. 9. As shown in FIG. 11, if called, ExecKey permits the operator to alter the mode of display on display 390 by means of selector keys 364-367. ExecKey first detects whether the user has selected zoom mode, which will be the case if the user has pressed unshifted selector key 366. If the system is in zoom mode, map.type is modified according to whether a double or quadruple enlargement has been selected.

The next step of ExecKey is to set the map type by assigning a value to map.type. The default is scroll mode, but navigational mode or history mode may be selected with appropriate selector keys 364-367. For example, the history mode is displayed if the user has selected unshifted key 365 on front panel 361. In the history mode, display 390 displays four views of the map in 0.5 second intervals, representing four frames frozen at 30 minute intervals over the immediate past two hours. This permits the user to discern movement of weather within previous period of time. After map.-type is set ExecKey calls ColorIt.

Figure 14:
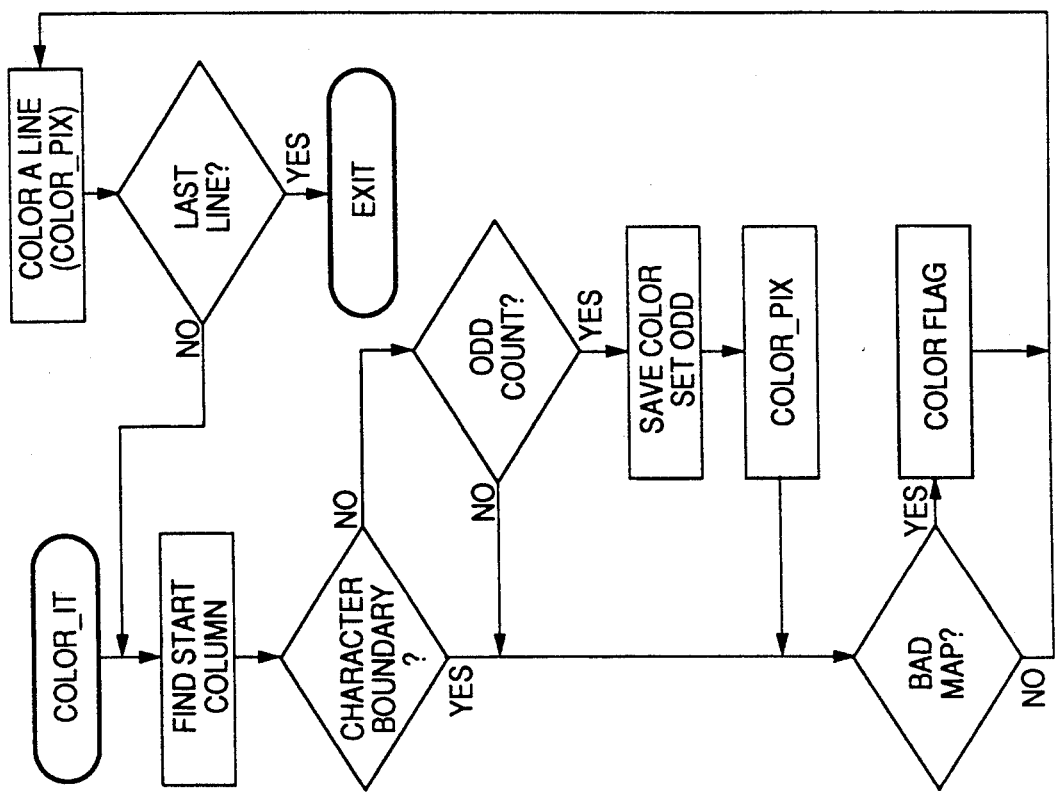
FIG. 14 is a flow chart of the system's ColorIt procedure.

ColorIt is illustrated in FIG. 14. Generally, this procedure is used to display a color map on display 390. The first step is to find a start column. ColorIt then determines whether there is a Character Boundary flag. This occurs when the run line encoded data calls for fewer pixels to be colored than are in the encoded character. The Character Boundary flag decision controls whether a nested loop will be executed, in which case ColorIt decides what to do with the extra information. For a color display two pixels are required for each color. If there is an odd count in a color byte, ColorIt takes the maximum of two possible colors. The next step of ColorIt is to decide whether the incoming map has a Bad flag. If so, an appropriately colored flag is displayed on display 390, which indicates to the user the confidence level of the map currently being displayed. In the preferred embodiment, there are three confidence levels, each represented by a different color flag.

ColorIt calls ColorPix, which draws a color picture on display 390. ColorPix is illustrated in FIG. 15. ColorPix detects input from unshifted selection key 367 on front panel 361 to determine whether the user has selected to strip levels of color. By manipulating unshifted selector key 367, the user can strip the first and the second levels of precipitation intensity.

ColorIt then determines whether the current line is the last line. The number of lines is determined by the type of map. After ColorIt is executed, the ExecKey ends and returns to the calling procedure.

FIG. 16 illustrates IRQ, a first program interrupt. Generally, IRQ is a hardware forced jump to a procedure, CharInt. CharInt is shown in FIG. 16. CharInt generally reads control codes in incoming data. IRQ also determines if there is an overflow in the buffer. If so, all flags are reset before CharInt continues. The next step of CharInt is to determine whether the system is in search mode. If so, CharInt looks for either a start of map signal or a start of history signal. The start of map signal is indicated by the control code 05 in incoming data, as explained above.

Figure 17:
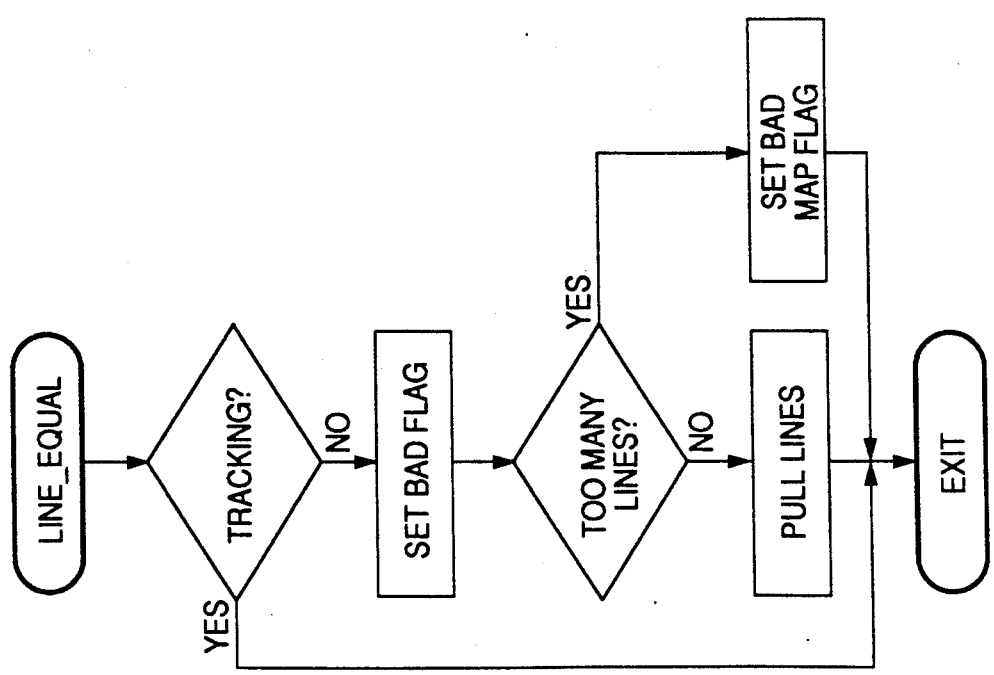
FIG. 17 is a flow chart of the system's LineEqual procedure.

If not in search mode, CharInt looks for other codes such as status, start of line, and end of map. For each start of line code, CharInt calls LineEqual, which is shown in FIG. 17. LineEqual first determines if receiver 320 is tracking the signal correctly. This is a decision made by computer 360, which keeps track of the line number of the last line received. If the next line number is correct, the tracking decision is "yes" and LineEqual returns to IRQ. If a line number error is detected, however, the Bad flag is set. LineEqual keeps track of how many lines are bad and if a predetermined number of lines in each map are erroneous, the Bad flag is set and the processing returns to IRQ. If there are not too many lines, Line Equal examines the line above the erroneous line and if it is error free, the erroneous line is replaced with the one above it.

FIG. 18 illustrates FIRQ, a second program interrupt. Generally, FIRQ is a fast interrupt initiated by screen refresh timing, or field sink. This screen refresh timing is controlled by VDC 630. FIRQ calls a procedure, FieldSinkInterrupt, in which tick, a variable, increments a counter. The keyboard is then read to determine what mode of display 390 is currently being displayed. The current map structure is then read, which tells the interrupt what to do. FieldSinkInterrupt then deincrements the counter, which determines when the current map structure will point to a new map structure. This then determines the mode of display and the length of time for that display.

As the user moves from the broadcast range of one FM station, the system is designed so that a new FM station range will be entered. By tuning receiver 320, the user may receive a new map. In the preferred embodiment, each FM station has a range of up to 200 miles at altitude, thereby permitting the user to travel up to 400 miles between FM stations while continuously receiving NWS weather information.

It should be understood that, as described above, the invention may be received at a location with no preexisting receiving equipment. The invention is easily adapted, however, for use at locations already having equipment. For example, an aircraft already having a CRT screen for receiving airborne radar could utilize the invention with the existing CRT screen.

It should also be understood that the use of computer 360 permits the system to process data from other sources and incorporate such data with the data described above. One such application could be cloud cover data from satellites. For example, on airplanes or other mobile receiving units, the invention could be interconnected with a LORAN or similar unit that gives geographic co-ordinates of the location of the receiving unit. This information could be displayed on display 390 together with the previously described weather information. Another source of information useful in avionics is transponder information that communicates to ground stations where the receiving unit is in relation to other aircraft. This type of information could be used for collision avoidance applications.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. A portable receiving unit for generating a visual graphic display from data transmitted from a subsidiary communication authorized FM radio site, using a subcarrier channel having a narrow bandwidth, comprised of:

a receiver for receiving said data at a remote location, said receiver being especially designed for receipt of subcarrier channel transmissions;

a post-transmission processing system for processing said data at said remote location, so that said data may be displayed in visual form, said post-transmission processing system being in in-line communication with said receiver;

wherein said receiver and said post-transmission processor are housed at the same receiving station in close physical proximity to each other, said receiver having means for shielding said receiver from interference such that said receiver may operate simultaneously with said post-transmission processor; and a display for displaying said data in visual graphic form at said remote location, said display being in in-line communication with said post-transmission processing system.

2. The system claimed in claim 1, wherein said receiver comprises a printed circuit board having multiple layers, and wherein at least one layer contains circuitry and at least one layer is a shielding layer.

3. The system claimed in claim 1, and further comprising a pre-transmission processing system for receiving said visual graphics data and for processing said data prior to transmission over said subcarrier, said pre-transmission processing system being programmed to compact said data, such that said data may be transmitted over said subcarrier channel in near real time.

4. The system claimed in claim 1, wherein said receiving unit is mobile as well as portable such that it may be non-stationary during use, and wherein said post-transmission processing system is programmed for error correction by detecting incorrect data and substituting proximate data for incorrect data.

5. The system claimed in claim 4 wherein said computer is further programmed such taht said error detection is accomplished with a line counting algorithm.

6. The system claimed in claim 4, wherein said post-transmission processing system is programmed to detect an error if a complete frame of said visual graphics data is not received within a predetermined time period.

7. The system claimed in claim 1 wherein said visual graphics data is weather data and wherein said post-transmission processing system is programmed to provide a weather map on said display.

8. The system claimed in claim 7 wherein said post-transmission processor is further programmed to provide navigational calculations and plotting on said display.

9. The system claimed in claim 1 wherein said in-line communication between said receiver and said post-transmission processing system is by means of a fiber optics transmission system comprised of a fiber optics transmitter at said receiver, a fiber optics detector at said post-transmission processing system, and a fiber optics cable between them.

10. A method for communicating visual graphics data from a network of subsidiary communication authorized FM radio sites to a remote and mobile receiving station, using a subcarrier channel having a narrow bandwidth, comprising the steps of:
processing said data prior to transmission from said FM site, said processing including compaction of said data such that said data may be transmitted over said subcarrier in near real time;
modulating said data after said data has been compacted to a subcarrier channel of said FM site, as required by said subcarrier channel;
transmitting said data on a subcarrier frequency of said FM site;
receiving said data at said remote location, using a radio receiver tuned to an in-range site within said network of FM sites, in a manner compatible with said subcarrier transmission;
processing said data, after transmission, at said remote location so that said data may be displayed in visual graphics form, using a computer in close physical proximity to said receiver, such that said receiver and said computer may be easily transported as a portable unit;
wherein said receiving step and said processing step occur in parallel;
shielding said receiver from interference resulting from said processing step;
displaying said data in visual graphics form at said remote location; and
re-tuning said receiver at said remote and mobile receiving unit to a different receiving frequency as one of said FM sites becomes out of range and another of said FM sites becomes within range.

11. The method claimed in claim 10, wherein said processing step prior to transmission includes adding additional data from a source other than said video graphic data source, and wherein said processing step after transmission includes providing a user interface on said computer such that said additional data may be displayed.

12. The method claimed in claim 10, wherein said processing step prior to transmission further comprises the step of storing historical samples of said data at predetermined intervals and said processing step after transmission further comprises providing a user interface on said computer such that said historical data may be displayed.

13. The method of claim 10, wherein said processing step prior to transmission includes compaction of said data by means of run line encoding.

14. The method of claim 10, and further comprising the step of using said post-transmission processor to detect errors in said data and to correct said errors by substituting a proximate line of said data for an erroneous line.

15. The method of claim 14, wherein said step of detecting errors is accomplished with a line tracking algorithm.

16. A mobile receiving unit for creating a visual graphics display in near real time from compacted data transmitted on a radio channel, using a subsystem of an existing communication system having a transmitter, and using a narrow bandwidth for the transmission, comprising:
a receiver for receiving said signals from said transmitter;
a post-transmission processing system for receiving said signals from said receiver and for converting said signals to data usable by a visual graphics display, wherein said post-transmission processing system is programmed for error correction by detecting whether correct data has been received and substituting a proximate line for an incorrect line; and
a display for displaying said data in visual graphics format, said display being in in-line communication with said post-transmission processing system.

17. The receiving unit of claim 16, wherein said post-transmission processing system is further programmed such that said error detection is accomplished with a line counting algorithm.

18. The system of claim 16, wherein said post-transmission processing system is programmed to detect an error if a complete frame of said visual graphics data is not receiving within a predetermined time period.

19. The system of claim 16, wherein said post-transmission processing system is in close physical proximity to said receiver and uses timing signals that potentially interfere with signals received by said receiver, and wherein said interference is avoided by shielding said receiver, said shielding being accomplished by placing said receiver on a printed circuit board having mutiple layers having circuitry on at least one layer and having shielding on at least one other layer.

20. A system for receiving and displaying weather maps in visual graphics form, for which the data has been transmitted by radio subcarrier channel in compacted form, comprising:
- a receiver for receiving said compacted data, said receiver being designed for receipt of subcarrier channel transmissions;
- a processing system for interpreting said compacted data and for processing said compacted data, so that said data may be displayed in visual form in near real time, said processing system being programmed to ensure a continuously updated display, and said processor system being in in-line communication with said receiver;
- wherein said receiver and said post-transmission processing system are housed in close proximity to each other and wherein said receiver has means for shielding said receiver from interference such that said receiver may operate simultaneously with said computer; and
- a display for displaying said data in visual graphics form at said remote location, said display being in in-line communication with said processing system.

21. The system of claim 20 wherein said receiver comprises a printed circuit board having multiple layers, and wherein at least one layer contains circuitry and at least one layer is a shielding layer.

22. The system of claim 20 wherein said processing system is programmed to store previous maps upon request by a user via a user interface.

23. The system of claim 20, wherein said processing system is programmed to display navigational calculations and for plotting upon request by a user via a user interface.

* * * * *